F. E. KINSMAN.
FOOD PRODUCT AND PROCESS OF MAKING THE SAME.
APPLICATION FILED NOV. 22, 1918.

1,344,638.  Patented June 29, 1920.

Witness
C. F. Nissen

Inventor.
Frank E. Kinsman
by attorneys
Southgate & Southgate

UNITED STATES PATENT OFFICE.

FRANK E. KINSMAN, OF LEOMINSTER, MASSACHUSETTS.

FOOD PRODUCT AND PROCESS OF MAKING THE SAME.

1,344,638. Specification of Letters Patent. Patented June 29, 1920.

Original application filed June 4, 1917, Serial No. 172,577. Divided and this application filed November 22, 1918. Serial No. 263,765.

*To all whom it may concern:*

Be it known that I, FRANK E. KINSMAN, a citizen of the United States, residing at Leominster, in the county of Worcester and State of Massachusetts, have invented a new and useful Food Product and Process of Making the Same, of which the following is a specification.

This is a division of my Patent No. 1,287,044, granted December 10, 1918, on a hulling machine, on an application for Letters Patent filed June 4, 1917, Serial No. 172,577.

This invention relates to a new food product formed from beans and to a process of making the same.

The principal objects of the invention are to provide an edible bean meal, paste, or liquid which will have all the nutritive elements of the ordinary dry bean, but will be without the portions of the bean which make it difficult of digestion and which also will keep indefinitely even in a dry state; and to provide it in such form and by such process that it will be suitable for shipping and have good keeping qualities and be excellent for use in making soups. The product is intended to take the place of the canned bean products on the market and constitutes an improvement over the same for the reason that, when sold in a dry state, there is no water in the package and the consumer gets a maximum amount of food value. It also constitutes an improvement over all forms of bean meal and paste known to me.

The invention also involves an improved method of preparing the beans whereby almost one hundred per cent. of the hull material is removed in an expeditious manner.

Reference is to be had to the accompanying drawings, in which—

Figure 1:
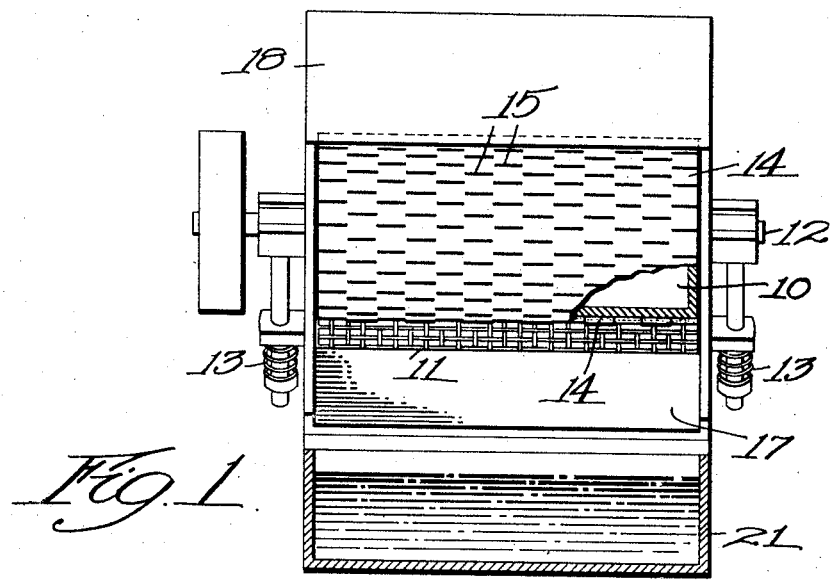
Figure 2:
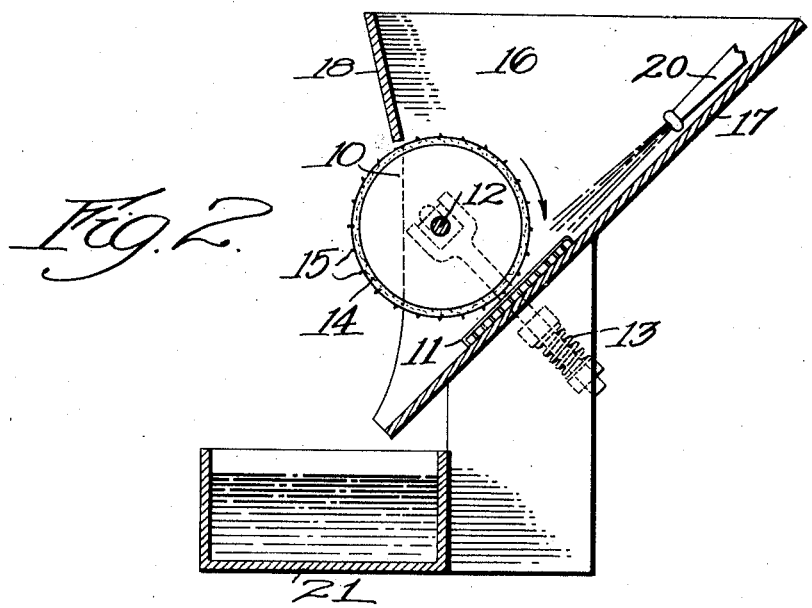

Figure 1 is an elevation of a preferred form of hulling machine designed to be used with this invention, and showing parts in section taken through the center of the hulling drum, and Fig. 2 is a transverse sectional view of the same.

Analysis of ordinary dry beans containing hulls shows a food value per pound of over 1500 calories, being much larger than that indicated for sirloin beef steak, fowl and other meats, but I remove the hulls so the food value per pound is undoubtedly higher still. Furthermore by removing the hulls the digestibility is very greatly improved because the hulls contain practically all the indigestible matter found in the entire bean. I find that the removal of the hulls of beans is a difficult matter. They will not come off in a dry state as is the case with peas, nor is it possible to remove them without injury to their edible qualities merely by cooking and treatment with lye as is the case with hulled corn.

In carrying out this invention in its preferred form, the whole dry beans are first soaked in water. After this a small amount of lye is added or sodium bicarbonate, either or both, or some astringent material that will attack the hulls without materially affecting the bodies of the beans and cause the hulls to contract or expand to a different degree from the interiors so that there will be a preliminary loosening of the hull without any kind of crushing or other change in shape of the body or softening thereof. The amount of lye and bicarbonate of soda required can be varied within wide limits, but is subject to the judgment of the operator. Both can be used or the lye can be omitted if desired. In this liquid the beans are heated to about the boiling point as required but not cooked. Then the heating operation is discontinued and the liquid drained off and kept because I find that it can be used over and over. Cold fresh water is then flushed over the beans to cool and wash the soda and lye away from them. At this stage it will be found that the hulls still stick to the beans or at least a very large percentage of them do, and I have found no economical way of separating these hulls merely by washing. The beans are now in an uncooked condition and retain their natural shape.

The next step of the operation consists in putting the beans through a huller, preferably as represented in the drawing. This huller comprises, in addition to the frame, a hulling drum 10 which is rotated at a low speed almost in contact with a wire screen 11. This wire screen is preferably formed of galvanized wire and has a rather large mesh preferably over one-eighth of an inch between the wires, depending on the size of the beans used. This is located at an inclination under the drum. The meshes provide indentations in which the beans have a tendency to lodge while being operated on by the drum. The shaft 12 which carries the drum is free to move in its bearings toward and from the screen and is provided with springs 13 at each end to yieldingly press it toward the screen against the beans thereon as the drum, as shown is not heavy enough for this purpose. The drum itself is covered with a layer of textile material 14, preferably canvas and on this canvas are arranged a plurality of longitudinal rows of soft projections 15 which can conveniently be made of cord. This is sewed into the canvas so as to provide a series of these projections spaced apart at a distance substantially equal to the length of the projections in alternate rows and staggered as clearly indicated. This feeds the beans forward and prevents their being fed too fast.

The operation of this huller is very simple. The beans in the condition just described above with their hulls loosened but sticking to them are introduced into the hopper 16. This is formed by an inclined plate 17 on which the screen 11 is located and a plate 18 on the other side with the ends and the drum itself at the bottom. The drum rotating in the direction indicated has a tendency to draw the beans into the space between it and the screen, but owing to the yielding nature of the projections 15 and the depressions or meshes in the screen it will do this best with the aid of a stream of water coming from the nozzle 20. The beans in this manner are forced between the drum and the screen and tend to lodge for a short period of time in the meshes of the screen while the projections on the drum rub over the surfaces. In this way the hulls are separated from the pulp, but the pulp body is not mashed or its shape changed in any material degree. The hulls and beans together run down the inclined plate 17 into a receptacle 21 placed in proper position for receiving them. It is found in practice that less than one per cent. of the beans go into this receptacle with the hulls upon them and in fact this process is substantially perfect in that respect. The hulls are separated from the beans simply by agitation and flotation or by flotation alone, which is impractical by the old or colander method, heretofore used after cooking, thus necessitating the loss of much food value and the presence of a material percentage of hulls in the product. These hulls constitute a waste product having no material food value. It will be noted that up to this point the beans are not cooked. The beans are then thoroughly cooked so as to reduce them to a pulp which is then thoroughly dried, milled and bolted to reduce it to a smooth condition. During the milling and bolting processes or afterward as desired a preservative is introduced for the purpose of keeping weevils out of the product when it is stored for a long time. Various preservatives may be used, but I prefer to use common salt because it will be necessary for flavoring any way, and it serves both purposes perfectly. The material is dried if to be used as meal or flour for making bread or the like. If it is desired to sell it in a wet condition the drying can be dispensed with and the material canned as a paste.

The finished product, therefore, consists of the bean meal or paste, salted or spiced, ground to any desired degree of fineness, usually to the degree found in ordinary flours. This product is pure and nutritious to the highest degree. It will keep indefinitely in ordinary paste-board packages and having been thoroughly cooked no living organism can be retained in it when manufactured.

In the use of this product by the consumer the paste is used or the meal is mixed to a paste with cold water, a little corn starch or flour, milk and butter may be added. It is then ready for the table by the addition of boiling water and seasoning to taste for the purpose of making a soup. I have found in practice that soups made in this way are entirely free from the usual difficulty which is found with beans because they are much more digestible and produce none of the troubles that are ordinarily experienced from eating beans. I also thin the paste with water before putting it up to make a bean bouillon for convalescents that is delicious, especially if flavored with tomatoes or the like.

Although I have described the invention as applicable to ordinary beans I wish it understood that I do not wish to be limited to any particular species, and although I have described a specific order of steps, I am aware of the fact that modifications can be made therein without departing from the scope of the invention as expressed in the claims. Therefore I do not wish to be limited to these in every instance, but what I claim is:—

1. The process of preparing a food product which consists in bringing softened whole beans up to the boiling point in water containing an alkaline astringent to swell and wrinkle the hulls without affecting the interior of the beans, discontinuing the boiling as soon as it commences to prevent cooking of the beans and loss of their original form, washing the astringent from the beans, then passing the beans between two relatively movable surfaces to mechanically remove the hulls from the uncooked beans, cooking the beans thereafter and thereby reducing them to a pulp, drying, grinding, and bolting the pulp to produce a dry cooked food in powdered form suitable for shipping and having good keeping qualities.

2. The process of preparing a food product which consists in placing beans in a moist state and with their hulls loosened on an inclined screen, forcing a current of water downwardly along said screen to force the beans over the screen, rotating in contact with them, while on the screen, a canvas surface provided with irregular projections to remove the hulls, and finally drying the beans.

3. The process of preparing a food product which consists in loosening the hulls of whole beans, then while they are in a loosened condition passing them over a surface having indentations therein, and moving in contact with them a surface provided with comparatively soft projections thereon to remove the hulls without material injury or loss of any part of the body or kernel of the bean.

In testimony whereof I have hereunto affixed my signature.

FRANK E. KINSMAN.